United States Patent
Khare et al.

(10) Patent No.: US 8,121,276 B2
(45) Date of Patent: Feb. 21, 2012

(54) MULTICAST CALL PROCESSING UNIT FOR TELECOMMUNICATION DEVICES

(75) Inventors: Rajendra Kumar Khare, Bangalore (IN); Brajabandhu Mishra, Orissa (IN); Sandeep Kumar Relan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1426 days.

(21) Appl. No.: 11/156,710

(22) Filed: Jun. 21, 2005

(65) Prior Publication Data

US 2007/0002776 A1  Jan. 4, 2007

(51) Int. Cl.
*H04M 3/42* (2006.01)
*H04M 1/00* (2006.01)

(52) U.S. Cl. ............ 379/202.01; 379/158; 455/416

(58) Field of Classification Search ............ 370/260, 370/261, 262, 263, 270, 390, 312, 432; 379/93.21, 379/158, 202.01–206.01
See application file for complete search history.

(56) References Cited

U.S. PATENT DOCUMENTS

| | | | | |
|---|---|---|---|---|
| 5,200,951 A * | 4/1993 | Grau et al. | ........ | 370/261 |
| 6,683,870 B1 * | 1/2004 | Archer | ........ | 370/356 |
| 6,714,635 B1 * | 3/2004 | Adams et al. | ........ | 379/204.01 |
| 6,798,753 B1 * | 9/2004 | Doganata et al. | ........ | 370/260 |
| 7,079,495 B1 * | 7/2006 | Pearce et al. | ........ | 370/260 |
| 2003/0026407 A1 * | 2/2003 | Ernstrom et al. | ........ | 379/207.02 |
| 2004/0170264 A1 * | 9/2004 | Benco et al. | ........ | 379/202.01 |
| 2006/0154653 A1 * | 7/2006 | Wilson | ........ | 455/416 |
| 2006/0233334 A1 * | 10/2006 | Bingaman et al. | ........ | 379/126 |

FOREIGN PATENT DOCUMENTS

CN  1438807  8/2003

* cited by examiner

*Primary Examiner* — Fan Tsang
*Assistant Examiner* — Solomon Bezuayehu
(74) *Attorney, Agent, or Firm* — Thomas, Kayden, Horstemeyer & Risley, LLP (57) ABSTRACT

A multicast call processing unit receives a request from a requester, determines if the request is associated with a multicast function, identifies a plurality of destinations defined by the multicast function and establishes communication link between the requester and the plurality of destinations. In one embodiment, the call processing unit authenticates the plurality of destinations before establishing a communication link between them and the requester. If the request from the requester is not associated with the multicast function, then the call processing unit establishes a communication link between the requester and a single destination. In another embodiment, a supervisor manages the plurality of destinations.

30 Claims, 8 Drawing Sheets

MULTICAST CALL PROCESSING UNIT FOR TELECOMMUNICATION DEVICES

BACKGROUND OF THE INVENTION

1. Field of the Invention

The present invention relates to a multicast call processing unit for telecommunications devices, and more particularly the establishment of a multicast phone call that is triggered by a request from a telecommunications device to an exchange for the establishment of a communication link.

2. Description of the Related Art

Systems are available in the market which allow more than two people to listen, or to talk and listen, to each other simultaneously over communication links. Examples of such systems are audio bridging, parallel ringing, telephone line tapping systems. Audio bridging systems require a group of people to dial a special number. In parallel ringing systems, the authenticity of a person listening to a conversation is not guaranteed.

Typically, when a telecommunications device is used for communication, a particular number is dialed and a communication link is established between the calling phone and a recipient phone associated with a dialed number. If a person desires to talk to more than one individual, then the person has to call each individual using a separate phone call, employing a unique phone number for each individual. Alternately, all the individuals dial into a conference bridge using the same phone number, and they all talk to each other and listen to each other. This requires each individual to be able to dial in, and they need to be given the common bridging number, perhaps even a conference identification number, requiring a significant level of coordination and logistics.

SUMMARY OF THE INVENTION

It is an object of this invention to overcome the drawbacks of the above-described conventional network devices and methods. The present invention is directed to methods and systems for processing a request for establishing audio, video or data communication links that substantially obviate one or more of the problems of the art. By way of example, a request receiver receives a request from a requester entity for setting up a communication link. The communication link carries multimedia data including one or more of the following, but not limited to, audio, video, graphics, image, text and data. A determining unit determines if the request is associated with a multicast function. An identifying unit identifies multicast destinations defined by the multicast function and a communication unit establishes communication links with the multicast destinations if the determining unit determines that the request is associated with the multicast function and establishes communication links with a single destination if the determining unit determines that the request is not associated with the multicast function.

A requester entity and the multicast destinations can be one or more of, but not limited to a wired phone, a cellular phone, a wireless phone, a video phone, a computer, and an Internet phone. In one embodiment of the method described here, the determining unit employs a requester identification sent by the requester entity and the identifying unit employs the requester identification and a lookup table. A supervisory destination is determined. The supervisory destination is one of the multicast destinations. Optionally, the requester entity can be one of the multicast destinations. The supervisory destination is authenticated by the system, followed by authentication of the multicast destinations other than the supervisory destination. The authentication mechanism includes any possible authentication mechanism such as, username-password based, digital certificate based, GPS based, voice recognition based and secure ID based.

A call processing unit can include, one or more of the following: a request receiver, a determining unit, an identifying unit, a lookup table and a communication unit. In one variant of the method, the call processing unit solicits approval from the supervisory destination for connecting the requester entity with the multicast destinations, receives approval from the supervisory destination and establishes communication links between the requester entity and the multicast destinations. The call processing unit is an intelligent unit. It handles the processing of the request in real time. In one variant, the requester entity has no option to identify that the request sent by it to the network is associated with the multicast function. Optionally, the requester entity can be made aware of being connected to and communicating with the multicast destinations other than the supervisory destination.

These and other objects of the present invention will be described in or be apparent from the following description of the preferred embodiments.

BRIEF DESCRIPTION OF THE DRAWINGS

For the present invention to be easily understood and readily practiced, preferred embodiments will now be described, for purposes of illustration and not limitation, in conjunction with the following figures.

DETAILED DESCRIPTION OF THE PREFERRED EMBODIMENT(S)

Figure 1:
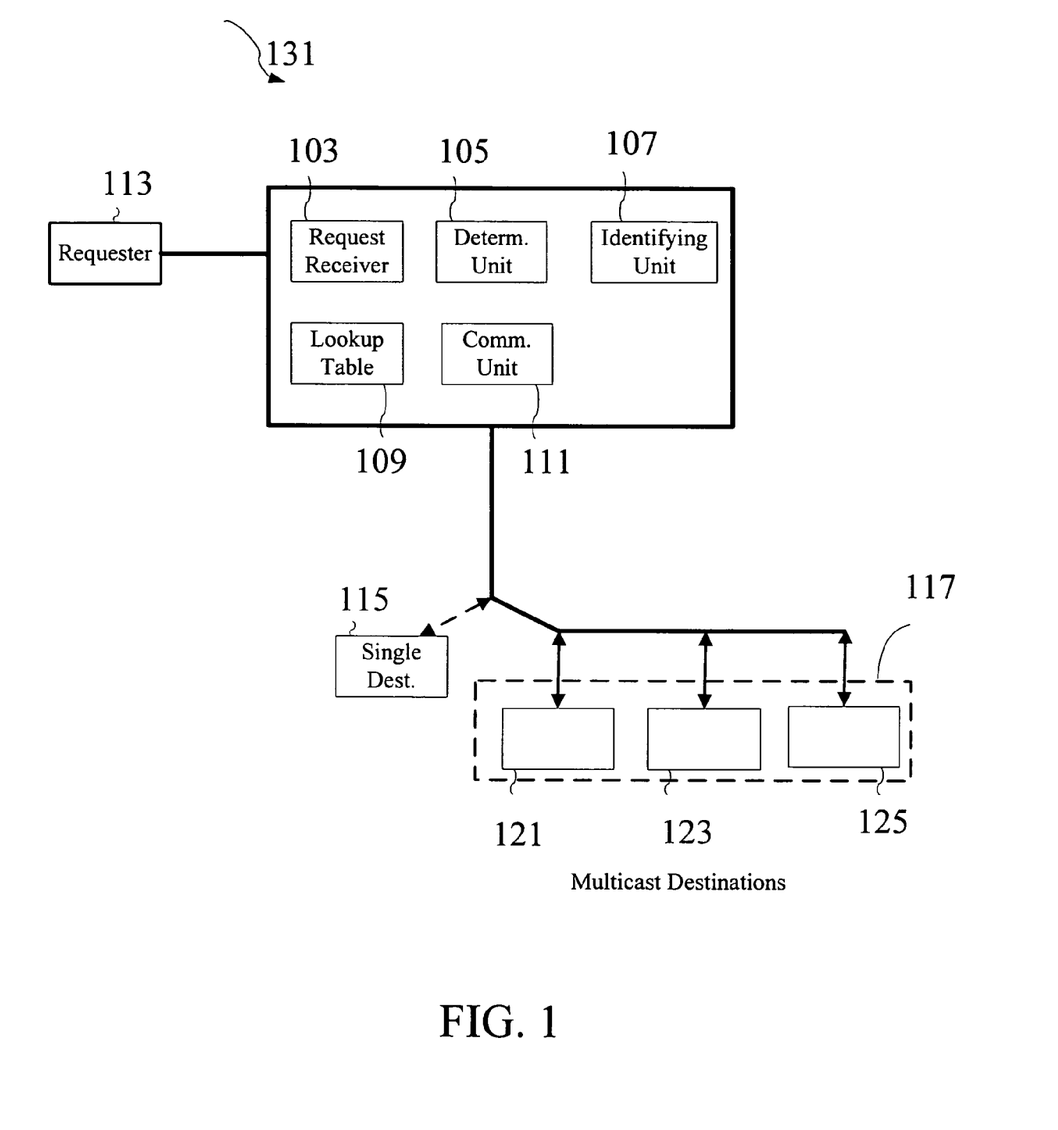
FIG. 1 is a schematic block diagram illustrating one embodiment of a multicast call processing unit.

FIG. 1 is a schematic block diagram illustrating one embodiment of the multicast call processing unit 131. The call processing unit 131 comprises a request receiver 103, a determining unit 105, a communication unit 111, a requester 113 and a multicast destinations 117.

The request receiver 103 is configured to receive a request from the requester 113 for setting up a communication link. The communication link carries multimedia data including at least one of, but not limited to, audio, video, graphics, image, text and data. The requester 113 communicates a requester identification to the request receiver 103. The determining unit 105 is configured to determine if the request from the requester 113 is associated with a multicast function. The determination is accomplished, in this example, by employing the requester identification. The requester identification comprises a multicast function indicator. An identifying unit 107 employs the requester identification and a lookup table 109 to identify the multicast destinations 117 defined by the multicast function. The lookup table 109 comprises a mapping of the requester identification to the multicast destinations 117. In one variant, the multicast destinations 117 comprises of at least one of a landline phone, a cellular phone, a video phone, a computer and an Internet phone.

Optionally, the multicast call processing unit 131 comprises the requester 113, the request receiver 103, the determining unit 105, the identifying unit 107, the lookup table 109 and the communication unit 111 which is configured to establish communication links with the multicast destinations 117. The multicast call processing unit 131 processes a communication request and causes the multicast destinations 117 to be incorporated into a multicast communications link such that the requester 113 and the multicast destinations 117 can communicate with each other. The request receiver 103, the determining unit 105, the identifying unit 107, the lookup table 109 and the communication unit 111 are communicatively coupled to each other in such a way so as to optimize the processing of the communication request.

In one variant, the communication unit 111 establishes a communication link with a single destination 115, if the determining unit 105 determines that the request from the requester 113 is not associated with the multicast function. The single destination 115 can be selected from the group of terminal units which can include a landline phone, a cellular phone, a video phone, a computer or an Internet phone. In addition, the communication unit 111 establishes a communication link with the multicast destinations 117, if the determining unit 105 determines that the request from the requester 113 is associated with the multicast function.

The multicast call processing unit 131 makes it possible for one requester 113 to communicate simultaneously with a plurality of destinations, collectively termed as the multicast destinations 117. The requester 113 is shown to be connected to the multicast destinations 117 using a solid line while the requester 113 is shown to be connected to the single destination 115 using a broken line. This convention illustrates the fact that the call processing unit 131 establishes communication link between the requester 113 and either of the single destination 115 and/or the multicast destinations 117. In one embodiment of the invention, the requester 113 belongs to group of multicast destinations 117.

Figure 2:
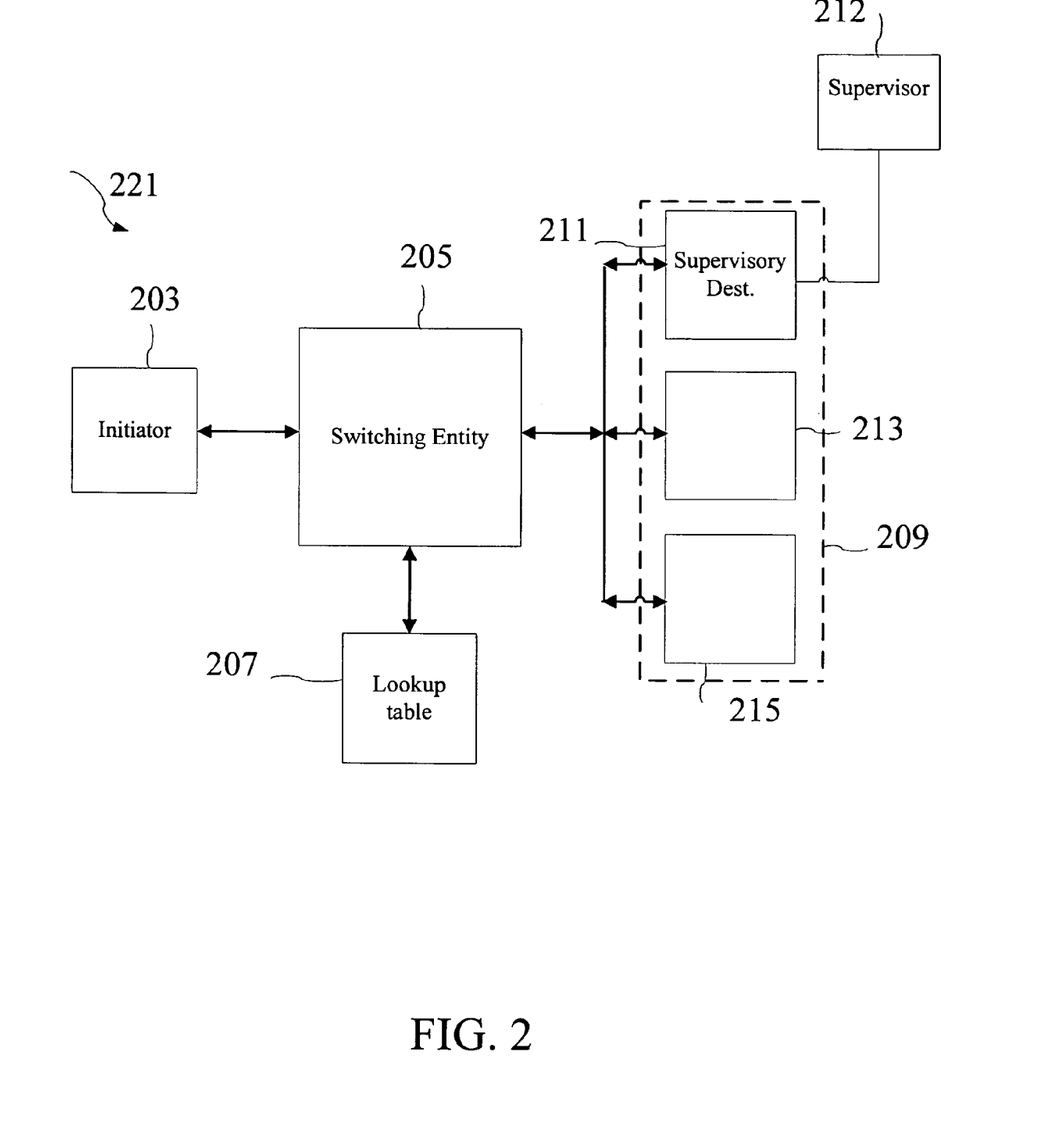
FIG. 2 is a schematic block diagram illustrating another embodiment of the multicast call processing unit.

FIG. 2 is a schematic block diagram according to the embodiment of the invention, illustrating a multicast call processing unit 221. An initiator 203 is communicatively coupled to a switching entity 205. The initiator 203 is configured to initiate a communication request by sending initiator information to the switching entity 205. The switching entity 205 upon receiving the communication request for connecting the initiator 203 with a plurality of destinations 209, determines the plurality of destinations employing a lookup table 207. The lookup table 207 is communicatively coupled to the switching entity 205. The lookup table 207 is configured to store a mapping of the initiator information to the plurality of destinations 209. The plurality of destinations 209 can include of at least one of a landline phone, a cellular phone, a video phone, a computer and an Internet phone.

The switching entity 205 determines a supervisory destination 211. The supervisory destination 211 is one of the plurality of destinations 209 and manages one or more of the others of the plurality of destinations 209. The switching entity 205 can, in one embodiment, authenticate the supervisory destination 211. Authentication mechanism can include any possible authentication mechanism including but not limited to one or more of the following: username-password based, digital certificate based, GPS based, voice recognition based and secure ID based. If the supervisory destination 211 is not authenticated by the switching entity 205, communicating with the plurality of destinations 209 is not permitted in one variant of the invention. Only after successful authentication of the supervisory destination 211, the rest of the plurality of destinations are authenticated. The plurality of destinations 209 hence communicate with the initiator 203 via the switching entity 205. In one variant of the invention, the initiator 203 is one of the plurality of destinations 209. Embodiments without the authentication function are also within the scope of this invention.

In one embodiment, a supervisor 212 is associated with and authenticated by the supervisory destination 211. The supervisor 212 manages the plurality of destinations 209. In a related embodiment of the call processing unit and system, the initiator 203 is made aware of the steps of determining the supervisory destination 211 and subsequent authenticating of the plurality of destinations 209.

In another embodiment of the system, the initiator 203 is unaware of being connected to and communicating with the plurality of destinations 209 other than the supervisory destination 211. In yet another variant of the system, the plurality of destinations 209 cease to communicate with the initiator 203 when the initiator 203 terminates communication with the switching entity 205. In yet another variant of the system, the plurality of destinations 209 continue to communicate among themselves when the initiator 203 terminates communication with the switching entity 205. In yet another version of the system, the initiator 203 and the supervisory destination 211 remain communicatively coupled when all or any one of the plurality of destinations 209 other than the supervisory destination 211 terminate communications between them and the initiator 203. Communication links between all the entities of the multicast call processing unit 221 carry multimedia data including one or more of the following but not limited to, audio, video, graphics, image, text and data.

Figure 3:
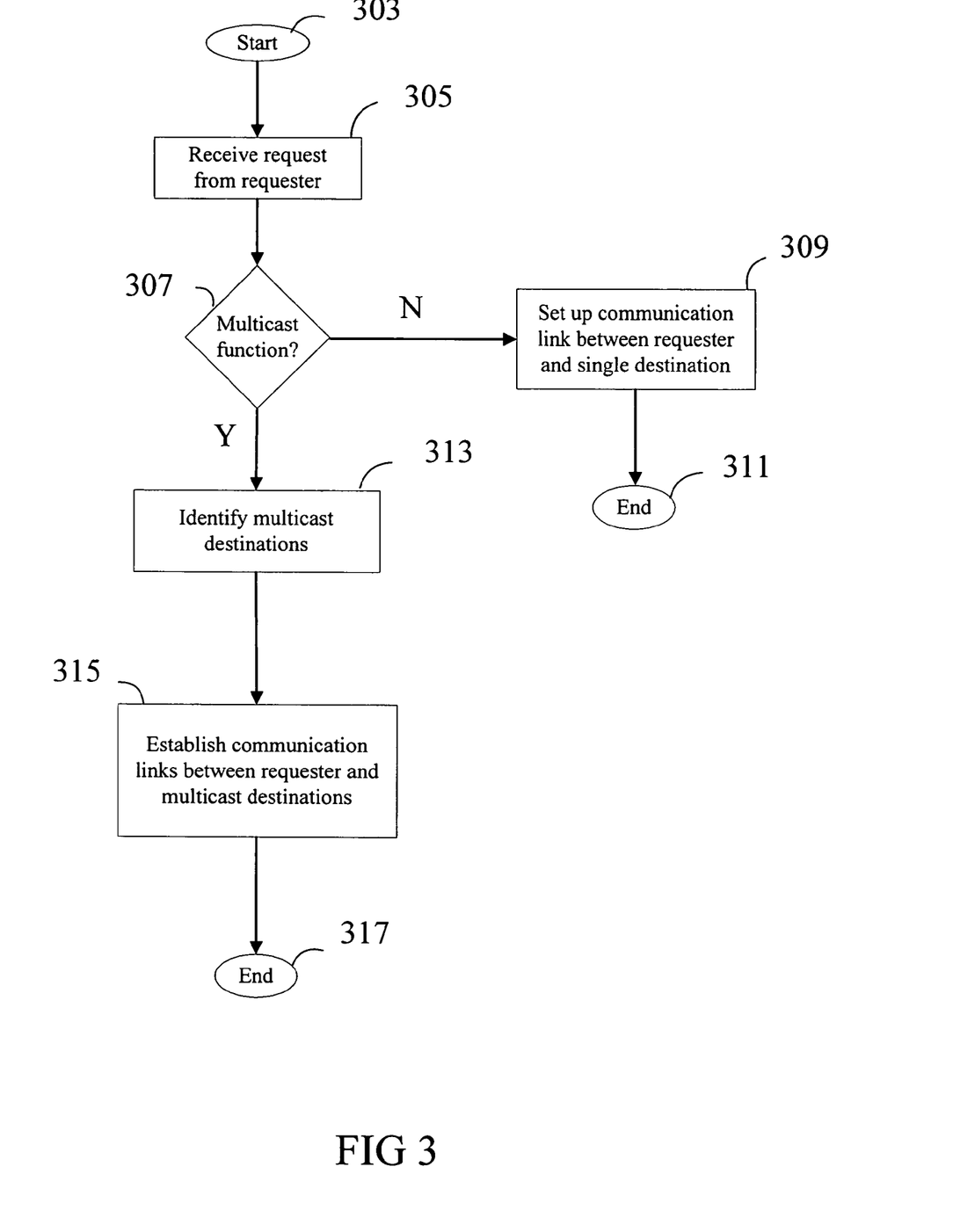
FIG. 3 is a flowchart illustrating an example of a method of establishing a multicast communication link.

FIG. 3 is a flowchart illustrating an example of a method of establishing a multicast communication link by a call processing unit. In FIG. 3, the processing of a communication request by the call processing unit starts at the block 303. At block 305, the call processing unit receives a request from a requester. At next query block 307, the call processing unit determines whether the request is associated with a multicast function. If not, then the process jumps to the block 309, wherein the call processing unit establishes a communication link between the requester and a single destination. Thus the method of processing the communication request ends at block 311. If the request from the requester is associated with the multicast function, the process goes to block 313. In block 313, the call processing unit identifies multicast destinations defined by the multicast function. The multicast destinations can include any type of multimedia device and communication appliance, including but not limited to one or more of the following: a landline phone, a cellular phone, a video phone, a computer and an Internet phone. In block 315 communication links are established between the requester and the multicast destinations. Thus the method of processing the communication request ends at block 317.

Figure 4:
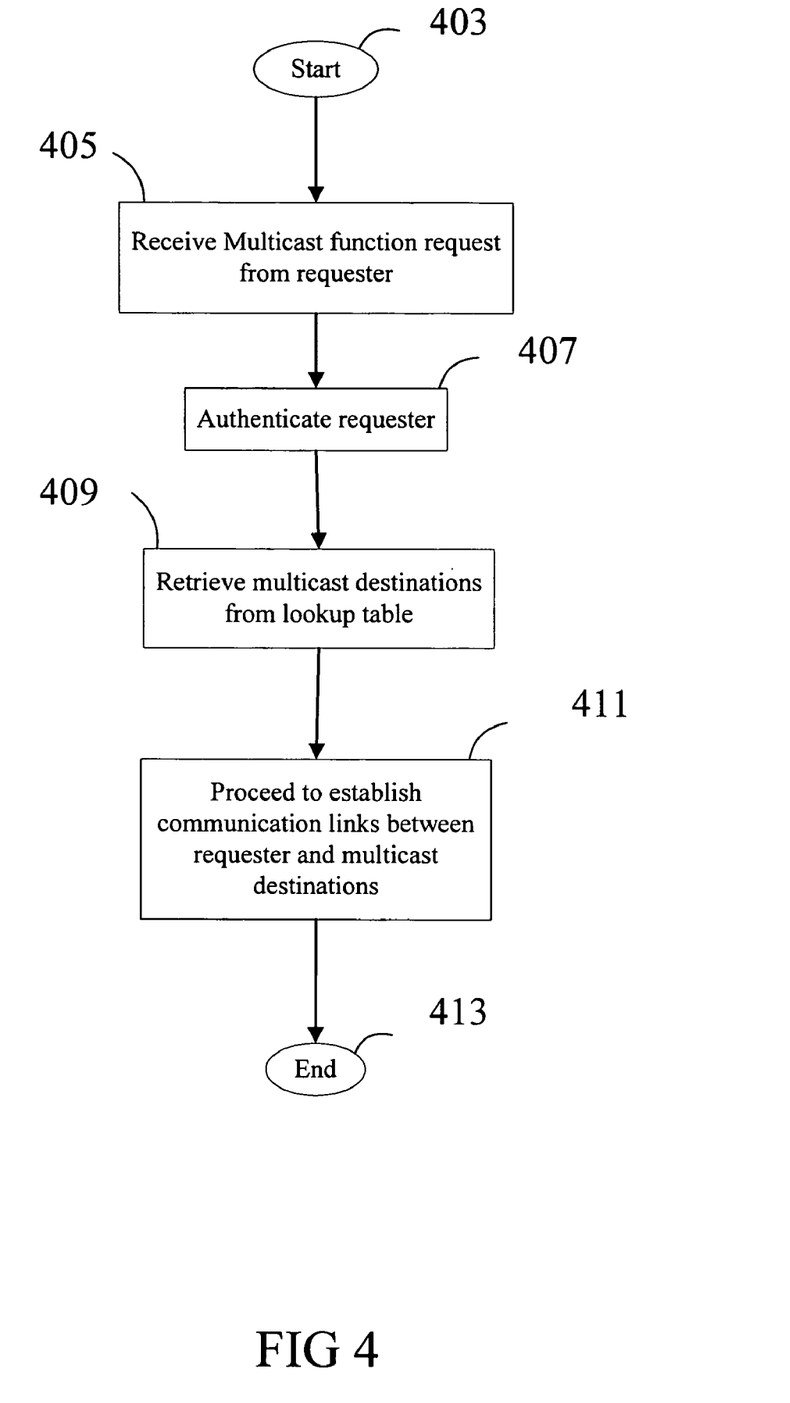
FIG. 4 is a flowchart illustrating the operations of authenticating a requester and retrieving multicast destinations if a request from the requester is associated with a multicast function, of FIG. 3 according to one embodiment of the present invention.

FIG. 4 is a flowchart illustrating the operations of authenticating the requester and retrieving multicast destinations if the request from the requester is associated with the multicast function, of FIG. 3 according to one embodiment of the present invention. The call processing unit receives the multicast function request from the requester in block 405. The call processing unit authenticates the requester in block 407 according to one embodiment of the present invention. After authentication, the multicast destinations are retrieved from a lookup table in block 409. Optionally the call processing unit employs a requester identification sent by the requester to retrieve the multicast destinations. In block 411 the call processing unit establishes communication links between the requester and the multicast destinations. Thus the method of processing the communication request ends at block 413.

Figure 5:
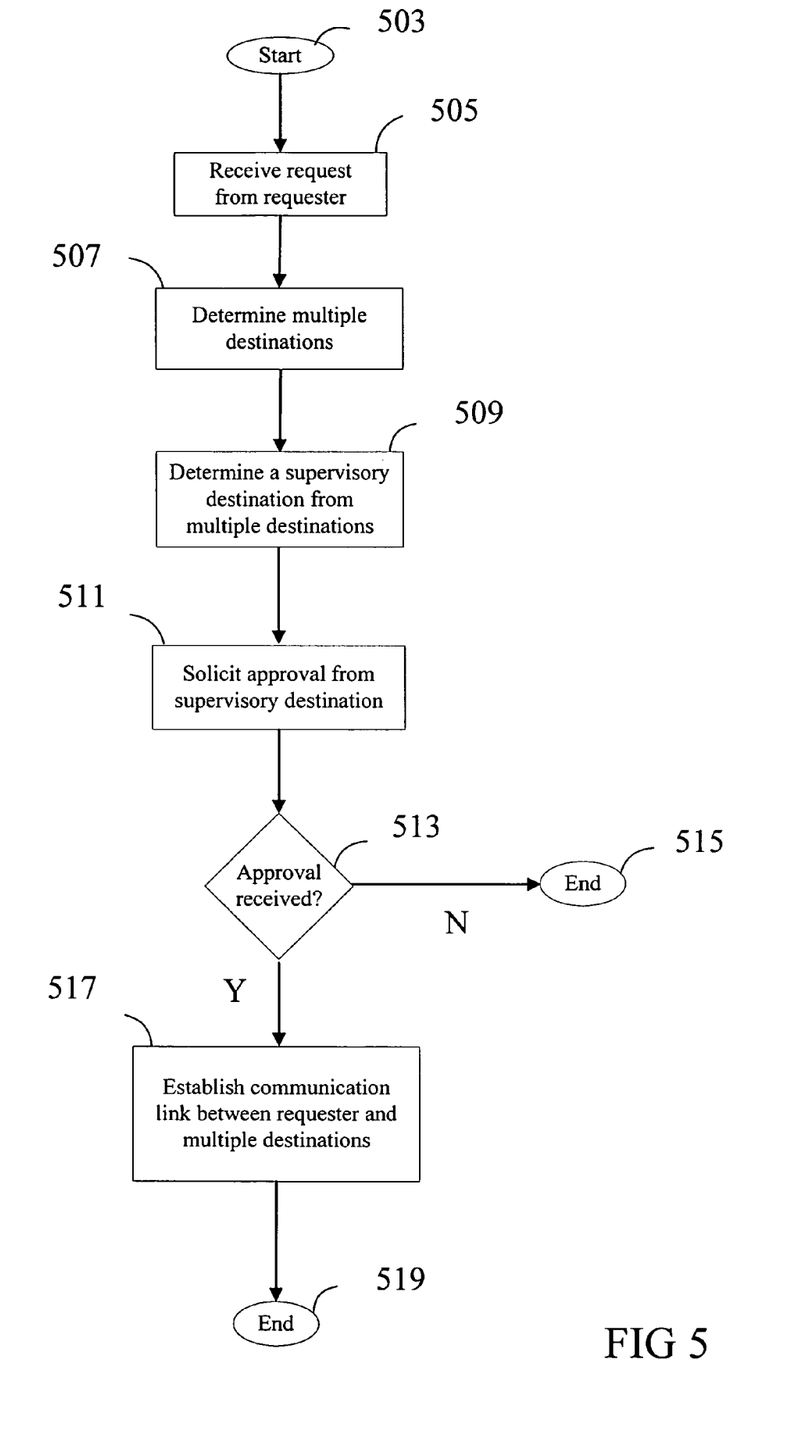
FIG. 5 is a flowchart illustrating an example of connecting a requester with a plurality of destinations.

FIG. 5 is a flowchart illustrating an example of connecting a requester with a plurality of destinations by a call processing unit. A request is received from the requester in block 505. In block 507, a plurality of destinations are determined. In 509, a supervisory destination from the plurality of destinations is determined. Approval is solicited from the supervisory destination for connecting the requester with the plurality of destinations in block 511. The request is dropped in block 515, if approval is not granted. A communication link is established between the requester and the plurality of destinations in block 517 on receiving approval from the supervisory destination. The plurality of destinations are, but not limited to, multimedia devices, communication appliances, or combinations of the above two. The communication link carries multimedia data or information via a single medium.

Figure 6:
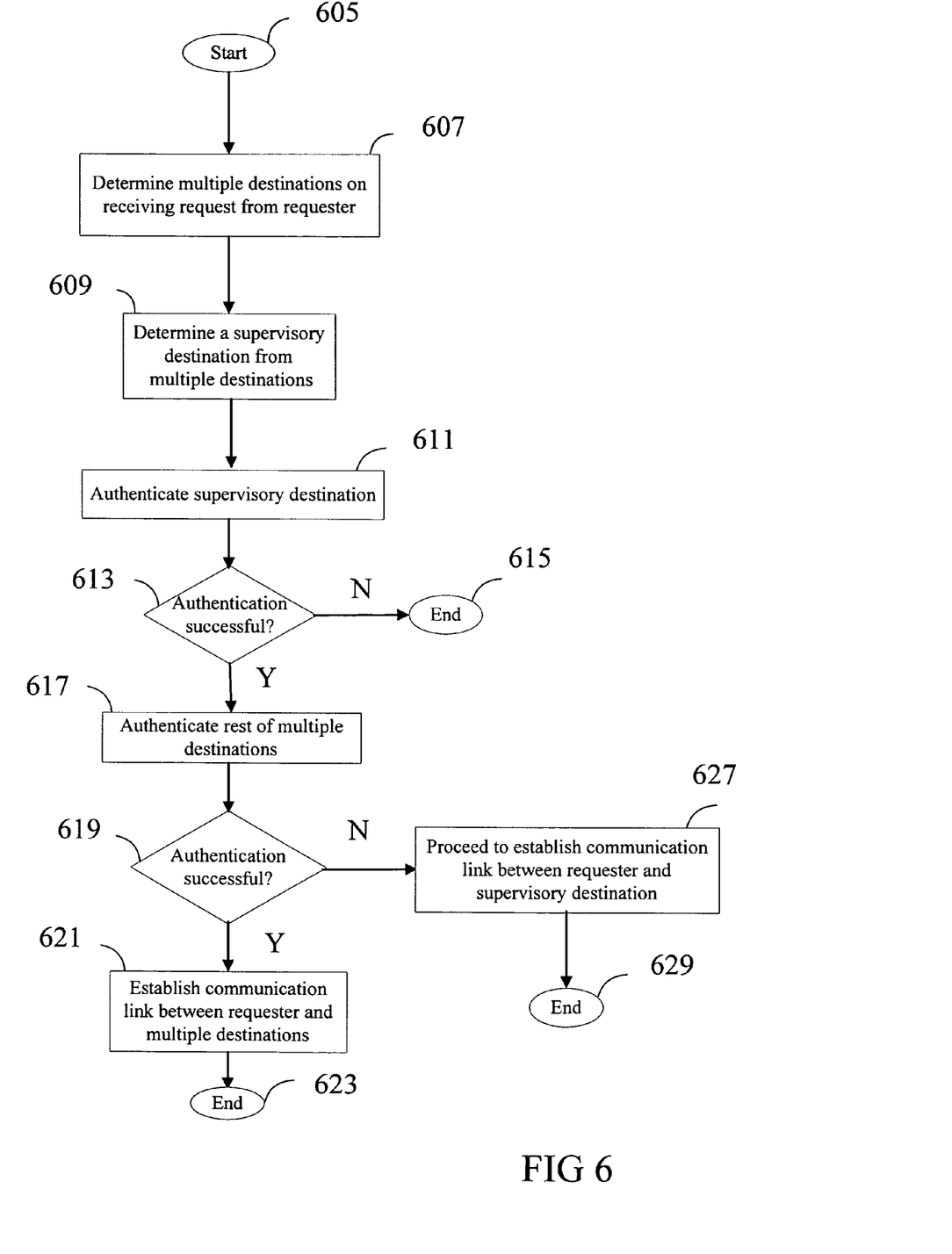
FIG. 6 is a flowchart illustrating the operations of determining a supervisory destination from the plurality of destinations, authenticating the supervisory destination followed by authenticating rest of the plurality of destinations other than the supervisory destination of FIG. 5 in accordance with one embodiment of the present invention.

FIG. 6 is a flowchart illustrating few operations of FIG. 5 in accordance with one embodiment of the present invention. The call processing unit determines the supervisory destination from the plurality of destinations in block 609 after determining the plurality of destinations in block 607. In the present embodiment of the invention, the call processing unit authenticates the supervisory destination in block 611. It determines if authentication is successful in block 613. If the authentication is not successful, then the requester is not connected with the plurality of destinations and the process ends in block 615. On successful authentication of the supervisory destination, the call processing unit authenticates the plurality of destinations other than the supervisory one in block 617. If authentication is not successful, then communication link is established between the requester and the supervisory destination in one embodiment of the invention. On successful authentication, the call processing unit establishes communication link between the requester and the plurality of destinations in block 621. The Authentication in block 611 and in block 617 include any possible authentication mechanism including but not limited to one or more of the following: username-password based, digital certificate based, GPS based, voice recognition based and secure ID based.

Figure 7:
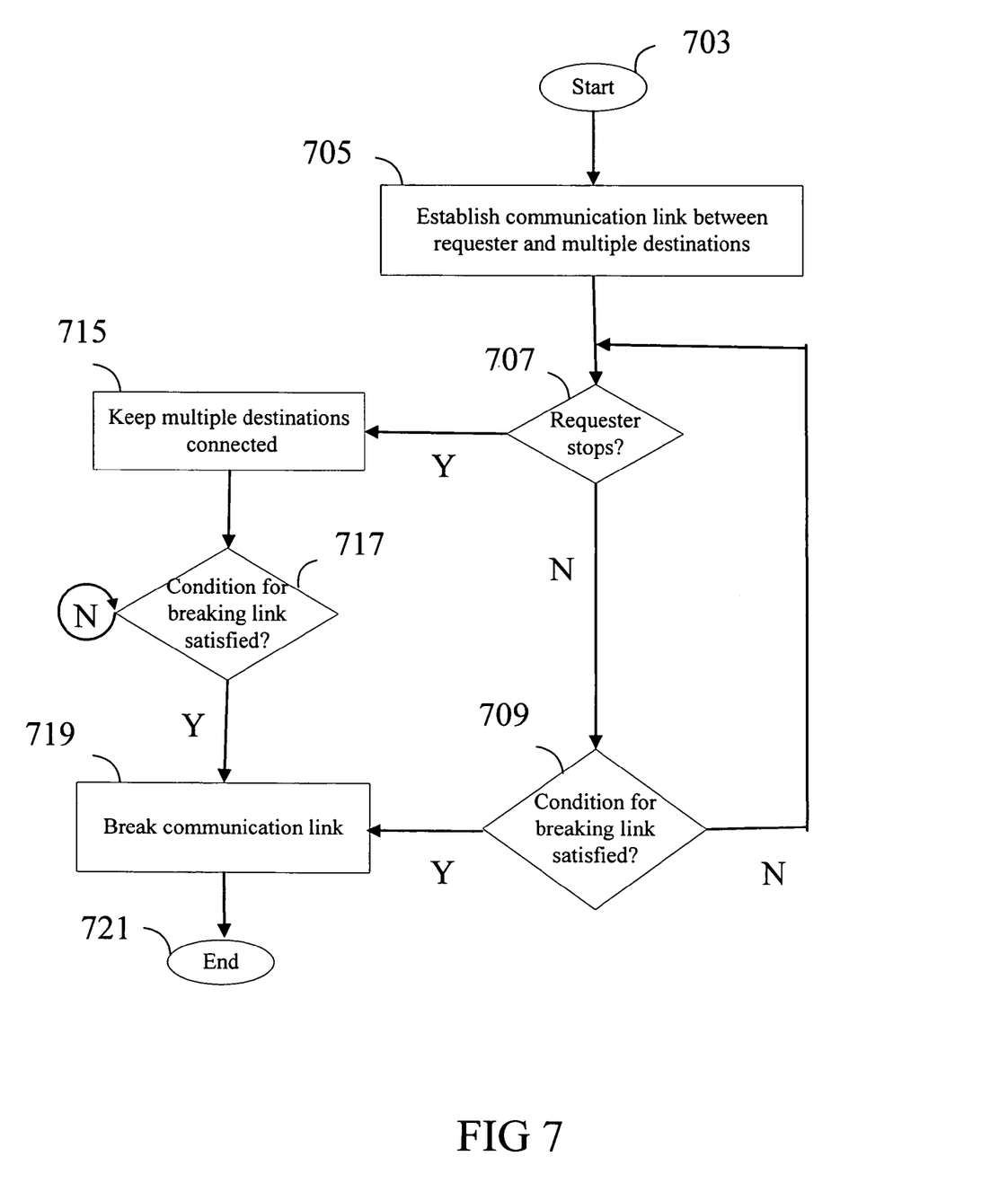
FIG. 7 is a flowchart illustrating how the requester controls termination of communication link established between the requester and the plurality of destinations of FIG. 6 according to one embodiment.

FIG. 7 is a flowchart illustrating how the requester controls termination of communication link established between the requester and the plurality of destinations of FIG. 6 according to one embodiment. The call processing unit finds out if the requester has stopped communicating with the plurality of destinations in block 707. If the requester stops, then the call processing unit keeps the plurality of destinations communicatively connected with each other, as shown in block 715. In block 717, the call processing unit determines if a link termination request has arrived. The link termination request comes from the supervisory destination. If there is a link break request, then the call processing unit breaks the communication link between the plurality of destinations, as shown in block 719. If the requester has not stopped communicating with the plurality of destinations, then the call processing unit breaks the communication link between the requester and the plurality of destinations if a condition for breaking link is satisfied, as shown in blocks 709, and 719.

Figure 8:
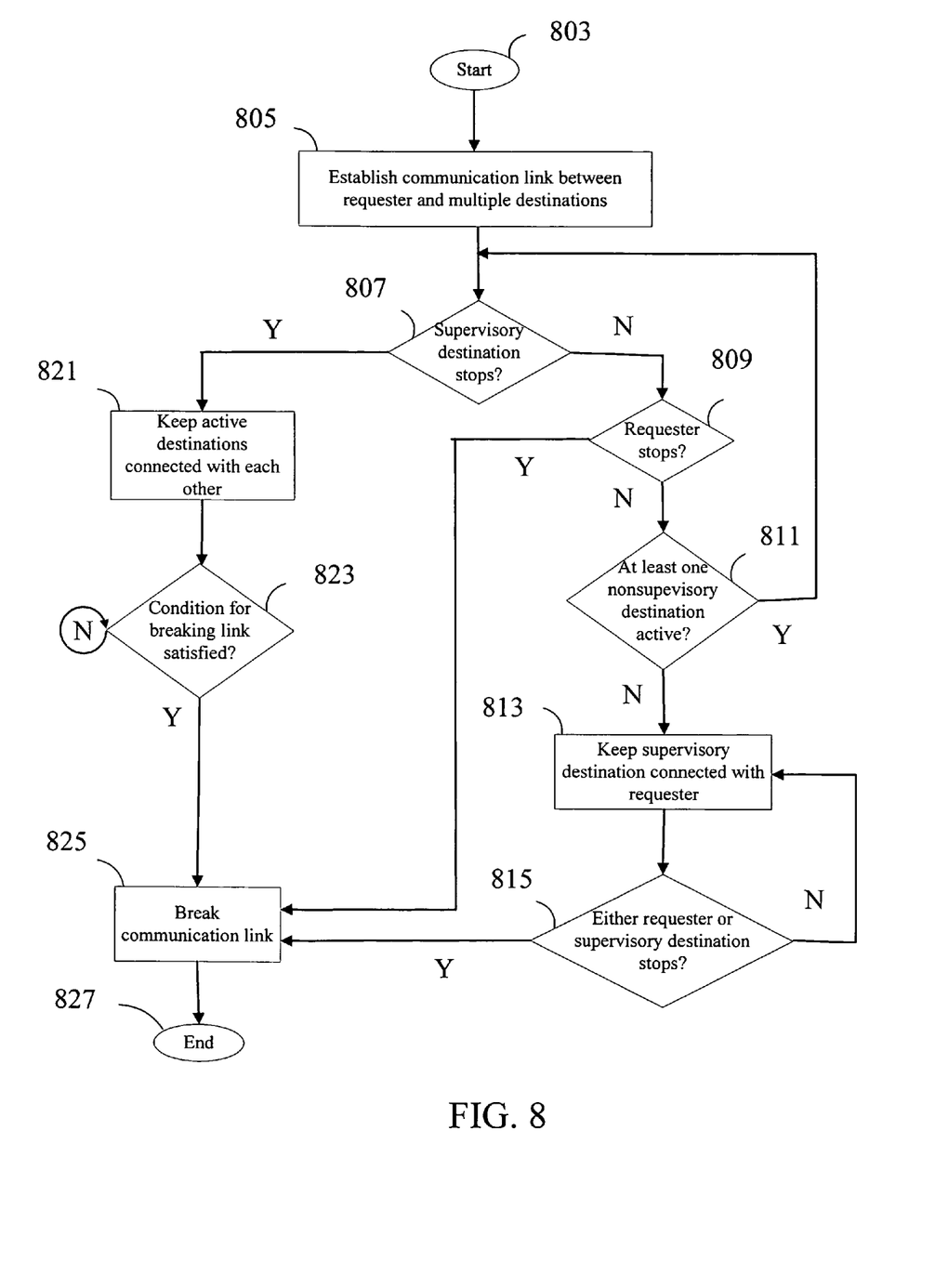
FIG. 8 is a flowchart illustrating how the supervisory destination and the requester control termination of communication link established between the requester and the plurality of destinations of FIG. 6 according to another embodiment.

FIG. 8 is a flowchart illustrating how the supervisory destination and the requester control termination of communication link established between the requester and the plurality of destinations of FIG. 6 according to another embodiment. In block 807, if the call processing unit determines that the supervisory destination has stopped communicating, then it keeps the requester communicatively connected with active destinations, as shown in block 821. If a condition for link termination is satisfied in block 823, then the call processing unit dismantles communication link between the requester and the active destinations as shown in block 825. The condition for link termination is a request from the requester or a situation where all the active users stop communicating with the requester.

The call processing unit finds out whether the requester has stopped communicating in block 809, after it learns that the supervisory destination has not stopped. If the requester stops, the call processing unit jumps to block 825 and breaks the communication link. If the requester does not stop, then the call processing unit keeps the supervisory destination communicatively connected with requester when all of the plurality of destinations other than the supervisory one stop communication. This is evident from the blocks 811, 813 and 815.

In one embodiment of the method, the requester entity is unaware of being connected to and communicating with the multicast destinations other than the supervisory destination. In another variant of the method, the requester entity is aware of the steps of determining and authenticating the supervisory destination followed by authenticating the rest of the multicast destinations. The requester entity has no option to identify that the request sent by it is associated with the multicast function. The requester entity is made aware of being connected to and communicating with the multicast destinations other than the supervisory destination optionally. The information flowing through a communication link between any two communicatively connected entity is one or more of the following, but not limited to, audio, video, graphics, image, text and multimedia data.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A method of processing a communication request in a communication system, comprising:
   receiving, by a call processing unit that performs a multicast function, a request from a requester device for setting up a communication link;
   determining, by the call processing unit, if the request is associated with a multicast function;
   identifying, by the call processing unit, a plurality of cellular phones that are multicast destinations using requestor device identification and a lookup table;
   determining, by the call processing unit, a particular cellular phone of the plurality of cellular phones to act as a supervisor destination and a multicast destination, the particular cellular phone managing one or more of the other cellular phones of the plurality of cellular phones;

establishing a communication link with the particular cellular phone before establishing communication links with the plurality of cellular phones; and establishing communication links to the plurality of cellular phones if the particular cellular phone is successfully authenticated by the call processing unit.

2. The method according to claim 1, wherein the communication links carry multimedia data.

3. The method according to claim 1, wherein the establishing of communication links to the plurality of cellular phones comprises authenticating the plurality of cellular phones.

4. The method according to claim 1, wherein the requestor device is unaware of being connected to and communicating with the plurality of cellular phones other than the particular cellular phone.

5. The method according to claim 1, comprising maintaining communication links between plurality of cellular phones even if the communication link with requester device is terminated.

6. A system for processing a communication request, comprising:

a request receiver configured to receive one or more requests from a requester entity;

a determining unit configured to determine if the request is associated with a multicast function;

an identifying unit configured to identify a plurality of video phones that are multicast destinations; and a communication unit configured to establish communication links with the plurality of video phones if a supervisory destination is first successfully authenticated, wherein the request receiver, the determining unit, the identifying unit and the communication unit are part of a call processing unit, wherein the call processing unit employs the communication unit to establish one or more communication links with the plurality of video phones if the determining unit determines that the request is associated with the multicast function, wherein, after the identifying unit identifies the plurality of video phones that are the multicast destinations, the call processing unit determines a particular video phone of the plurality of video phones to act as the supervisor destination and a multicast destination, wherein the call processing unit establishes a communication link with the particular video phones before establishing communication links with the plurality of video phones, wherein the call processing unit establishes communication links with the plurality of video phones after the call processing unit successfully authenticates the particular video phone, and wherein the call processing unit employs the communication unit to establish one or more communication links with a single destination if the determining unit determines that the request is not associated with the multicast function.

7. The system according to claim 6, wherein the identifying unit is configured to identify a plurality of video phones that are multicast destinations defined by the multicast function using the requestor entity identification and lookup table.

8. The system according to claim 6, wherein the communication links between the plurality of video phones are maintained even if the communication with the requester entity is terminated.

9. The system according to claim 6, wherein the determining unit supervises the communication between the requester entity and one or more multicast destinations identified by the identifying unit.

10. The system according to claim 6, wherein the call processing unit determines if a link termination request has arrived, and wherein the link termination request comes from the supervisory destination.

11. The system according to claim 6, wherein the call processing unit authenticates the particular video phone before authenticating the rest of the plurality of video phones.

12. The system according to claim 6, wherein the request receiver, the determining unit, the identifying unit and the communication unit form a single unit, and wherein the single unit is directly connected to the requestor entity, and wherein the requestor entity comprises one or more of the following: a wired phone, a wireless phone, a video phone, a computer and a network phone.

13. A system for communicating with a plurality of destinations, comprising:

a switching entity;

an initiator, communicatively coupled to the switching entity, the initiator configured to initiate a communication request, the initiator comprising a first phone; and a plurality of second phones that are multicast destinations configured to communicate to the first phone when connected by the switching entity, wherein the switching entity, the first phone and the plurality of second phones are arranged such that communications between the first phone and the plurality of second phones pass through the switching entity, wherein the switching entity determines the plurality of second phones by employing a lookup table that is configured to store a mapping of first phone information to the plurality of second phones, wherein, after determining the plurality of multicast destinations based on the first phone information, the switching entity determines a particular second phone of the plurality of second phones to act as a supervisory destination and a multicast destination, wherein the particular second phone manages the other second phones of the plurality of second phones, wherein the switching entity establishes a communication link with the particular second phone before establishing communication links with the plurality of second phones, wherein the switching entity authenticates the particular second phone before authenticating the other second phones of the plurality of second phones, and wherein the switching entity authenticates the first phone.

14. The system according to claim 13, wherein the first phone or the plurality of second phones comprise one or more of the following: a landline phone, a cellular phone, a video phone, and an Internet phone.

15. The system according to claim 13, wherein the switching entity determines if a link termination request has arrived, and wherein the link termination request comes from the particular second phone.

16. The system according to claim 13, wherein the communications between the first phone and the plurality of second phones comprise one or more of the following: voice, multimedia, audio, video, graphics, image, text and data.

17. The system according to claim 13, wherein the plurality of second phones are configured to continue to communicate among themselves when the first phone terminates communication with the switching entity.

18. A method of connecting a requester entity with a plurality of destinations, comprising:
- receiving, by a switching entity, a communication request from a first wireless communication device, the first wireless communication device being coupled to the switching entity;
- determining, by the switching entity, a plurality of second wireless communication devices by using a first wireless communication device identification and a lookup table;
- determining, by the switching entity, a particular second wireless communication device of the plurality of second wireless communication devices to act as a supervisory device and a multicast destination, the particular second wireless communication device managing other of the plurality of second wireless communication devices;
- establishing, by the switching entity, communications with the particular second wireless communication device before establishing communications with the plurality of second wireless communication devices;
- soliciting approval from the particular second wireless communication device for connecting the first wireless communication device with the plurality of second wireless communication devices;
- receiving approval from the particular second wireless communication device; and
- establishing communications between the first wireless communication device and the plurality of second wireless communication devices, the communications between the first wireless communication device and the plurality of wireless communication devices passing through the switching entity.

19. The method according to claim 18, wherein the first wireless communication device comprises one or more of the following: a wired phone, a wireless phone, a video phone, a computer and a network phone.

20. The method according to claim 18, wherein the plurality of second wireless communication devices comprise one or more of the following: a landline phone, a cellular phone, a video phone, a computer and an Internet phone.

21. The method according to claim 18, wherein the switching entity is a single unit and determines if a link termination request has arrived, and wherein the link termination request comes from the particular second wireless communication device.

22. The method according to claim 18, further comprising:
- authenticating, by the switching entity, the particular second wireless communication device; and
- authenticating, by the switching entity, the first wireless communication device.

23. The method according to claim 22, comprising authenticating, by the switching entity, the other of the plurality of second wireless communication devices after successfully authenticating the particular second wireless communication device.

24. The method according to claim 18, further comprising:
- maintaining the communications between the particular second wireless communication device and the first wireless communication device if the authenticating the plurality of multicast destinations other than the particular second wireless communication device fails.

25. The method according to claim 18, further comprising:
- receiving a second communication request from the first wireless communication device for establishing a communication link between the first wireless communication device and the plurality of second wireless communication devices and proceeding to establish the communication link if a time limit is not exceeded.

26. The method according to claim 18, further comprising:
- breaking the communication link between the first wireless communication device and the plurality of second wireless communication devices if the first wireless communication device stops communicating with the switching entity.

27. The method of according to claim 18, further comprising:
- continuing the communication link such that the plurality of second wireless communication devices stay communicatively connected with each other if the first wireless communication device stops communicating with the switching entity.

28. The method according to claim 18, further comprising:
- continuing a communication link such that the first wireless communication device and the particular second wireless communication device remain communicatively connected if all of the plurality of second wireless communication devices other than the particular second wireless communication device terminate communications with the first wireless communication device.

29. The method according to claim 18, further comprising:
- continuing a communication link such that the plurality of second wireless communication devices stay communicatively connected with each other if the particular second wireless communication device stops communicating with the switching entity.

30. The method according to claim 18, wherein the communication between the first wireless communication device and the plurality of second wireless communication devices are carried over a single medium.

* * * * *

UNITED STATES PATENT AND TRADEMARK OFFICE
CERTIFICATE OF CORRECTION

| | | |
|---|---|---|
| PATENT NO. | : 8,121,276 B2 | Page 1 of 1 |
| APPLICATION NO. | : 11/156710 | |
| DATED | : February 21, 2012 | |
| INVENTOR(S) | : Khare et al. | |

It is certified that error appears in the above-identified patent and that said Letters Patent is hereby corrected as shown below:

Column 10, line 20, please remove "the communication link" and replace it with "a communication link".

Column 10, line 27, please remove "the communication link" and replace it with "a communication link".

Signed and Sealed this
Fifteenth Day of May, 2012

David J. Kappos
*Director of the United States Patent and Trademark Office*